J. F. Hamilton.
Steam-Engine Valve-Gear.
No. 39,228. Patented July 14, 1863.
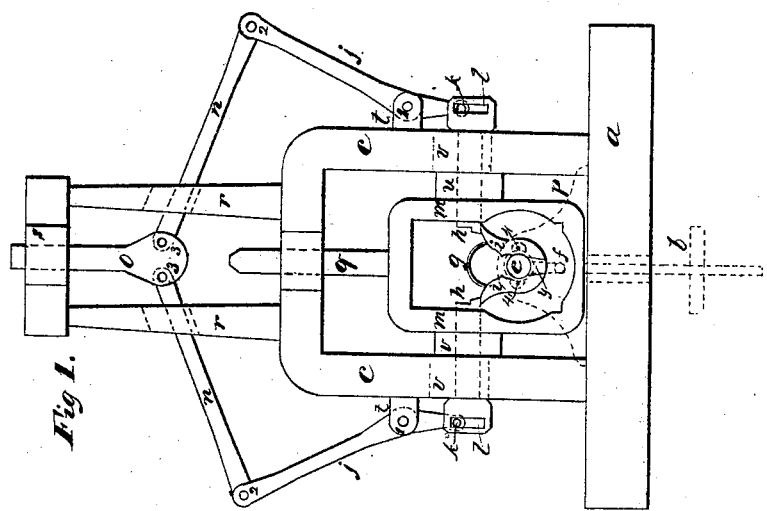
Witnesses
James J. Johnston
Alexander Hagg
Inventor:
Joseph F. Hamilton

UNITED STATES PATENT OFFICE.

JOSEPH F. HAMILTON, OF PITTSBURG, PENNSYLVANIA.

IMPROVEMENT IN CUT-OFF-VALVE GEAR FOR STEAM-ENGINES.

Specification forming part of Letters Patent No. 39,228, dated July 14, 1863.

*To all whom it may concern:*

Be it known that I, JOSEPH F. HAMILTON, of Pittsburg, in the county of Allegheny and State of Pennsylvania, have invented a new and Improved Cut-Off for Steam-Engines; and I do hereby declare that the following is a full and exact description thereof, reference being had to the accompanying drawings, and to the letters of reference marked thereon.

The nature of my invention consists in operating the valves of steam-engines by means of the device hereinafter described, said device being so arranged and operated that it will cause the valve or valves to cut off or admit steam to the cylinder in proportion to the power required of the engine.

To enable others skilled in the art to make and use my invention, I will proceed to describe its construction and operation.

In the accompanying drawings, Figure 1 is a side view of the apparatus for operating the valves. Fig. 2 represents the arm used for regulating the lift of the valve. Fig. 3 represents a jointed arm, which may be used for regulating the lift of the valve. Fig. 4 is a sectional view of the lifters and rock-shaft.

In the accompanying drawings, $a$ represents the base of the frame $c$. Inside of the frame $c$ is placed a frame, $m$, which is furnished with guides or slides $u$ and a stem, $q$, which passes through the top bar of frame $c$. To frame $m$ is also attached the stem of valve $b$. (Represented in dotted lines.) On the top of the cross-bar of frame $c$ are placed two columns, $r$, on the top of which is placed a cross piece, $s$, through which passes a rod, $o$, which is attached in any known way or manner to the governor of the engine. To rod $o$ are attached two arms, $n$, which pass through openings in the columns $r$, and are attached to two arms, $j$, which are attached to the lugs $t$ on frame $c$. On the lower end of the arms $j$ are wrists $k$, which move in slot $l$ of the regulating-arms $h$, which pass through openings in frame $c$, which are indicated by the dotted lines marked $v$. The arms $h$ also pass through openings made in the frame $m$ and guides or slides $u$.

$i$ represents the lifters, which are attached to lugs 4 on the rock-shaft $e$, which is furnished with a stop, $y$, against which rest the lower ends of the lifters $i$.

The dotted lines $p$ represent the bearings of the rock-shaft $e$, the crank of which is represented by the red dotted lines $f$.

It will be observed that the lifters $i$ may be made stationary on the rock-shaft $e$, and the arms $h$ jointed, as represented in Fig. 3 at $x$.

$g$ represents a spring used for the purpose of holding the lifters $i$ in their proper position. The lifters are made flexible for the purpose of allowing them to yield to the arms $h$ after having passed them in lifting the valve.

1, 2, and 3 represent joints.

I wish it to be clearly understood that I do not confine myself to any particular form or size of frames and other parts, provided the same end is accomplished.

The operation of my improvement is as follows: I attach the cam-rod of the engine to the crank $f$ on the rock-shaft $e$, which will impart an oscillating motion to the lifters $i$, which come in contact with the regulating-arms $h$, and thereby lift the frame $m$, which will lift the valve attached to it. The arms $h$ are drawn out and forced in by the governor raising and lowering the rod $o$. When the arms $h$ are forced in to their full extent then the valve will be lifted to its full extent and the engine will be working "full stroke." The steam is cut off in proportion to the distance that the arms $h$ are drawn out by the action of the governor.

It will be observed that by the use of this improvement I cut off or admit steam to the cylinder of the engine in proportion to the work that the engine is required to perform.

Having thus described the nature, construction, and operation of my improvement, what I claim as of my invention is—

The arrangement of the regulating-arms $h$, lifters $i$, spring $g$, frames $m$ and $c$, arms or levers $j$ and $n$, when used in connection with the governor and rock-shaft or eccentric of engines, the whole being arranged, constructed, and operating substantially as herein described, and for the purpose set forth.

JOSEPH F. HAMILTON.

Witnesses:
JAMES J. JOHNSTON,
ALEXANDER HAYS.